(12) United States Patent
Cerda-Vilaplana et al.

(10) Patent No.: US 6,206,186 B1
(45) Date of Patent: Mar. 27, 2001

(54) CASE FOR COMPACT DISCS, DIGITAL VIDEO DISKS OR THE LIKE

(76) Inventors: Gustavo Cerda-Vilaplana; Ruben Cerda-Torres, both of Avda. del Juguete, 14, Ibi (ES), 03440

( * ) Notice: Subject to any disclaimer, the term of this patent is extended or adjusted under 35 U.S.C. 154(b) by 0 days.

(21) Appl. No.: 09/530,839

(22) PCT Filed: Jan. 17, 1998

(86) PCT No.: PCT/ES98/00311

§ 371 Date: May 3, 2000

§ 102(e) Date: May 3, 2000

(87) PCT Pub. No.: WO99/27536

PCT Pub. Date: Jun. 3, 1999

(30) Foreign Application Priority Data

Nov. 20, 1997 (ES) .................................................. 9703025

(51) Int. Cl.[7] .................................................. B65D 85/57
(52) U.S. Cl. ........................ 206/308.1; 206/310; 206/493
(58) Field of Search ................................. 206/308.1, 309, 206/310–312, 493

(56) References Cited

U.S. PATENT DOCUMENTS

| | | | | |
|---|---|---|---|---|
| 5,788,068 | * | 8/1998 | Fraser et al. | 206/308.1 |
| 5,944,181 | * | 8/1999 | Lau | 206/308.1 |
| 5,988,375 | * | 11/1999 | Chang | 206/308.1 |
| 6,041,922 | * | 3/2000 | Kollinell | 206/308.1 |

FOREIGN PATENT DOCUMENTS

| | | |
|---|---|---|
| 4107218 A1 | 9/1992 | (DE) . |
| 2751777 A1 | 1/1998 | (FR) . |
| WO 9614636 A1 | 5/1996 | (WO) . |
| WO 9736298 A1 | 10/1997 | (WO) . |
| WO 9741563 A1 | 11/1997 | (WO) . |

* cited by examiner

*Primary Examiner*—David T. Fidei
*Assistant Examiner*—Shian Luong
(74) *Attorney, Agent, or Firm*—Adams, Schwartz & Evans, P.A.

(57) ABSTRACT

The invention relates to a box-shaped case (1) comprising a push-button (4) elastic part (2) with elastically deformable lateral branches (5) arranged in one of its covers (1*b*) whereby the top end thereof (5*a*) consists of a peripheral protuberance (5*b*) enabling a disc (3) to fit into the case by means of a central opening (3*a*). The lower part of lateral branches (5) is jointed to small flanges (6) which are inclined upwards and which converge towards the centre. Said flanges (6) form an angle in relation to the wall (7) of the cover of the case. The cover (1*b*) also has protuberances that are shaped like circular segments. The outer side or peripheral side of the disc rests against said segments at a given vertical height (11), whereby the disc is subjected to a slight amount of bending stress in a radial direction when it is fited into its housing.

1 Claim, 2 Drawing Sheets

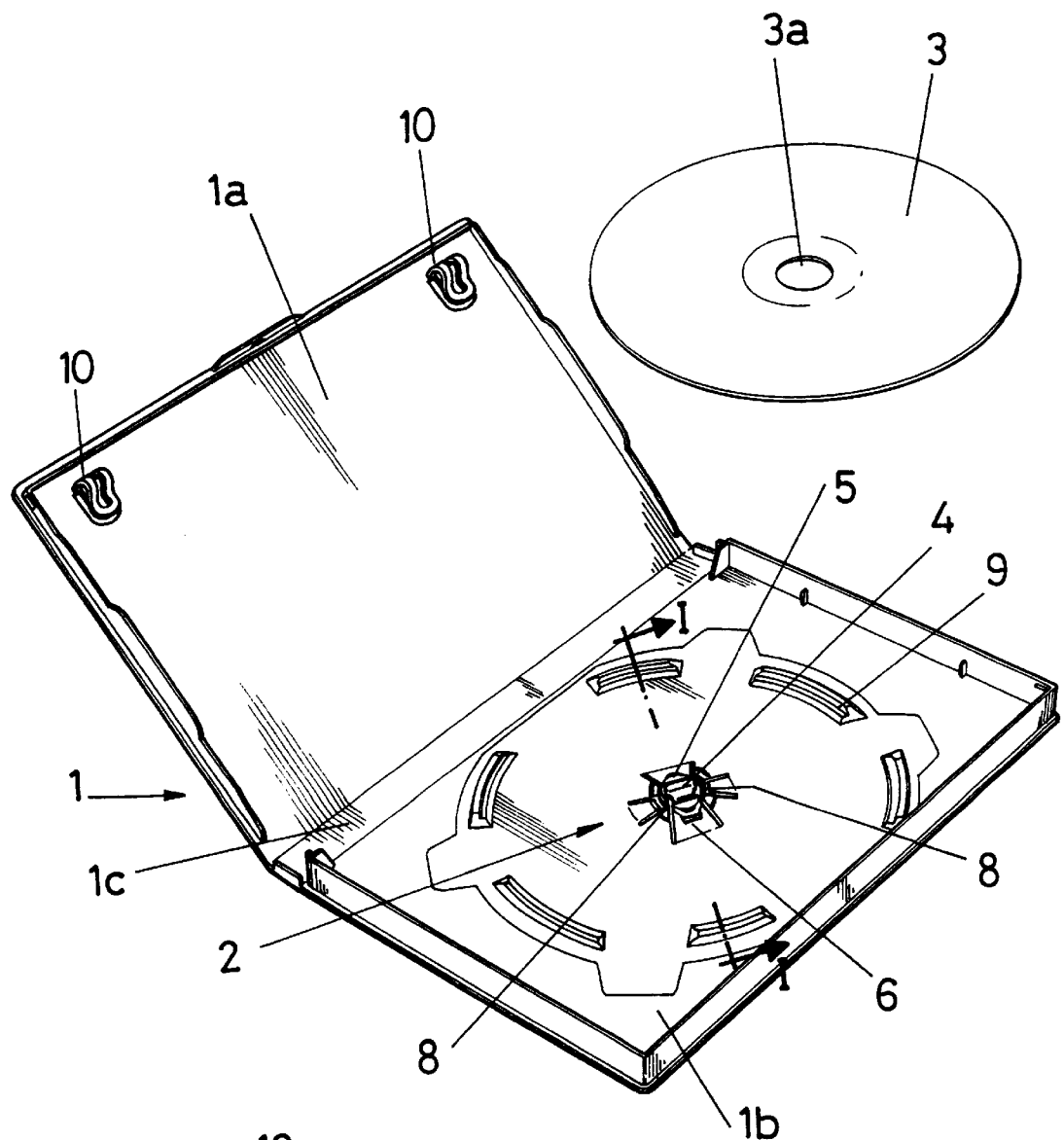
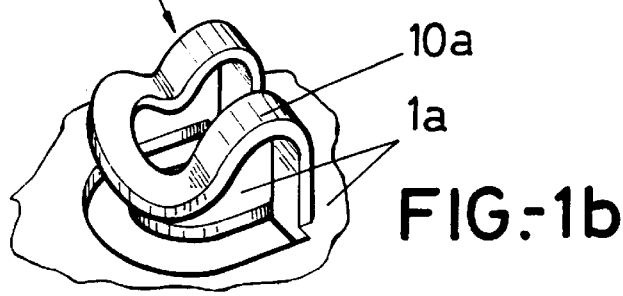
FIG.-1a
FIG.-1b

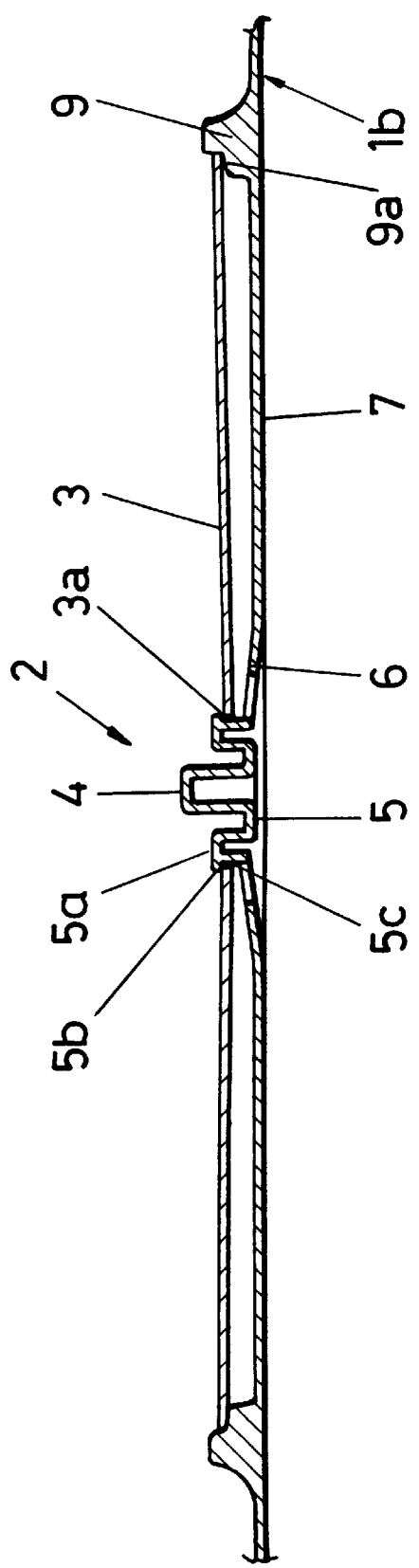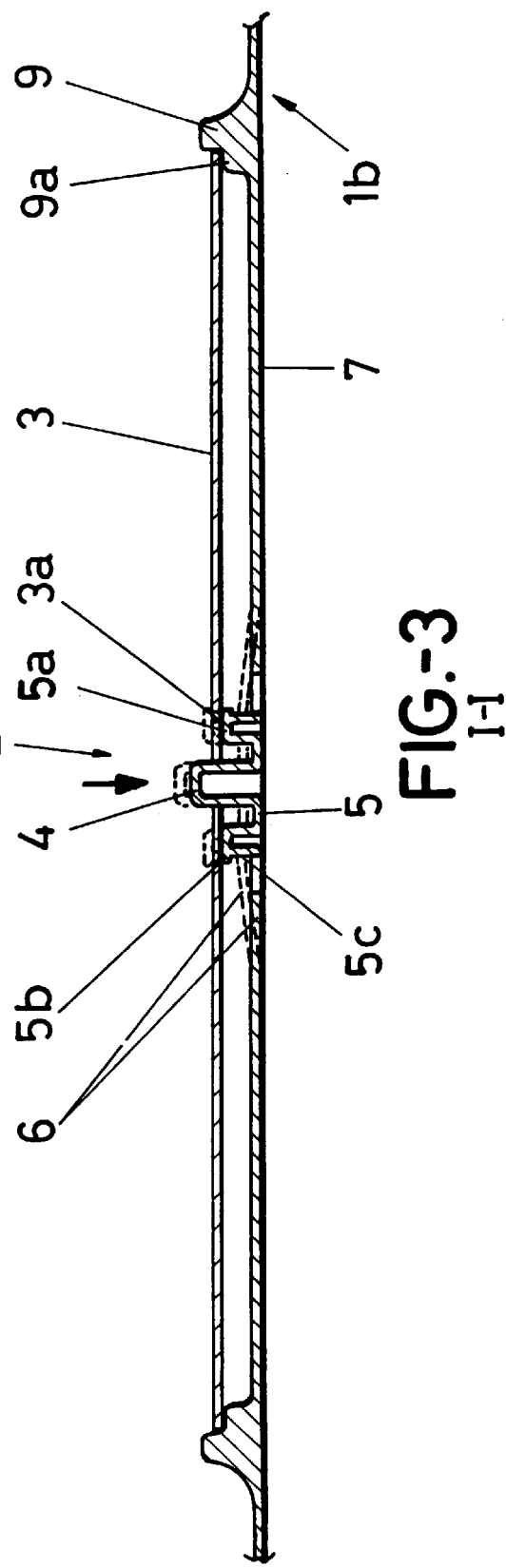

CASE FOR COMPACT DISCS, DIGITAL VIDEO DISKS OR THE LIKE

This application is a national stage application, according to Chapter II of the Patent Cooperation Treaty. This application claims priority from Spanish Application No. U 9703025 filed Nov. 11, 1997.

The present invention refers to a case for magnetic supports in disk shaped, such as compact disks (CD) and digital video disks (DVD) or similar.

At the moment diverse cases of this type are known, the most mentioned up to now being, the CD cases for audio and data and software.

In a similar way, these cases include in their central part a generally cylindrical projecting formation for a tight engagement in the central hole that is present in these types of disks and that protrudes from its upper part through the mentioned central hole of the disk when it is engaged in it. Also customarily, this cylindrical projection is deformable by compression, so that the disk can be released from its corresponding engagement when the user exercises a pressure on it, for example with one of his fingers.

Also, in general, the mentioned cylindrical formation, is provided integrally with the corresponding wall of the case, for example like a portion formed in molding processes for the production of the same. DE-4107218-A1 discloses a device to fix objects having a flat cross section and a hole for fixing element, such as for example a disc.

The document WO-9741563, considered as the closest prior art, discloses a case for a CD or the like made of plastics material and having a base and a hinged lid. The base and the lid have a generally square shape whereas the former also has generally cylindrical portion protruding upward and holding the CD in its central hole; this portion is elastic and can be pushed by the user in a downward direction against a bias force so as to release the discs. Particular embodiments of invention show a number of wall segments having together a buttonlike shape, and the upper parts of these wall segments have a peripheral projection for holding the disc as tight as possible, whereas the lower parts of the wall segments are connected to elastic wings which generate the upward bias force mentioned above. The wall segments and the wings are molded from the same plastics material.

From this configuration, different inconveniences result, like, for example, since the button is shaped by a number cylindrical wall segments, its upper base, over which the user exercises the pressure with his finger, is divided and has a cracks that tend to close when applying the release pressure, trapping (catching) the fingertip of the user, producing a disagreeable feeling for said user when trying to release the disc; also, burrs may from between these cracks during the molding process that would impede or hinder the release operation; also as the button is shaped by parts separated from each other, it can happen that the release pressure is exercised only over one or several of these parts, the remaining ones not acting, so that this release pressure can be insufficient to release the disc; on other hand, as the peripheral projections for holding the disc are shaped on the upper part of the cylindrical wall segments that shape the button, and the flexible wings are on the lower part of the button, the vertical excursion towards the bottom wall of the case should be of a considerable magnitude to such an extent that it surpasses the plane of this bottom wall, otherwise the peripheral projections for holding the disc should be very narrowly shaped so if they are worn with use they would lose their capacity to hold the disc; finally, when applying a release pressure on this device, as soon as the peripheral projections are below the lowest wall of the disc hole, said disc is released without any type of fastening, so that if the box does not occupy a perfectly horizontal position, the disc would fall without more from its engagement due to its weight, capable of hitting against the floor and being damaged.

The purpose of the invention is the development of a case of the type indicated foremost that presents an improved operation regarding to the prior art that is also of an easy manufacturing and safe operation.

In accordance with the invention this task is achieved, with a case made from plastic materials manufactured by means of molding processes, that has in the central part of one of its bindings or case covers and formed from the material of the wall of the same a portion deformable by compression on which stightly engage the disk through its central hole; the elastic portion being provided as a projection in a button-shape with lateral branches elastically deformable and an upper border with a peripheral projection for a corresponding engagement to the central hole of the disk, whose branches are connected in its lower end by some wings tilted upwards, also elastically deformable, formed from the material of the wall of the corresponding bindings or case cover; the mentioned elastic wings forming an angle in relation to the corresponding wall of the case cover; being provided a circumference projection for support of the external border of the disk on the wall of the case cover; wherein the button (4) properly said is shaped as a continuous surface without cracks of a reduced diameter in comparison to the diameter of the central hole (3a) of the disc and whose height is dimensioned so that its higher part is located above the vertical plane that contains the holding projections (5b) of the disc, the lowest part in this button (4) being linked to first L-shaped branches (5) directed (extending) upwards that each is prolonged in a second L-shaped branch (5a) bent downwards where said holding projections (5b) are formed, the lowest part (5c) of this second L-shaped branch (5a) being linked to the inclined wings (6) and said lower part (5c) being at a vertical distance regarding the bottom of the case (7) greater than the respective vertical distance of the lowest part of the button, and wherein, on the bottom of the case are provided additional fixed portions of a cylindrical wall (8) for guidance and support of the central hole (3a) of the disc (3), whose portion (8) are shaped on the same circumference where the vertical tracts of the second L-shaped branch (5a) lie.

This button-shape allows to eliminate thanks to the continuous surface, the effect of having caught the user's finger, also, as the upper part is located highly above the holding peripheral projections and the lower base of the button is bellow the point of junction of the second bent branch and the flexible wings, the holding exercised by the peripheral projections will always be released before said lower part of the button reaches the level of the bottom wall of the case.

Also, the additional fixed portions (8) that not act with release pressure serve to keep the disc centered on them even when the holding exercised by the peripheral projections (5b) has already been released, this way the disc is kept form falling if when releasing the disc the case is in a non-vertical position.

Other characteristics and advantages of the invention will be clearer from the following description, carried out with the help of the attached drawings applicable to a non-limiting execution example and where:

The FIG. 1a shows a view in upper perspective of a case for CD, DVD and similar according to the invention.

FIG. 1b, illustrates a detail in perspective of one of the fastening hooks anticipated in one of the case covers for the placement of printed material.

FIG. 2, shows a section view through line I of FIG. 1, with a disk engaged in this case.

FIG. 3, illustrates a section view similar to the preceding but with the device for disk release acting and in outline the condition represented in FIG. 2.

With reference to FIG. 1a observed is that case 1, is shaped, for example like a box with two covers or lateral bindings 1a and 1b joined on a central portion in spine shape 1c. This configuration is similar to well-known cases for video tapes but of lesser thickness.

Even when it is not part of the mentioned invention, as is shown in FIG. 1b inside of the lateral cover 1a, formations are provided in shape of pincers or hooks 10, with elastically deformable portions 10a that serve to hold and to maintain in position in an unfastening condition a pamphlet or similar, in general known as "library or literature" and that may contain information and instructions of all types regarding the content of the CD or DVD support. Similar dispositions are also known in CD cases for audio and for software.

Continuing with the reference to this FIG. 1a and with additional reference to FIG. 2, it is observed that in the cover or binding 1b of case 1, is provided, approximately in its geometric center, a generally cylindrical formation and designated in general by the numeric reference 2, in which is engaged tightly a CD, DVD or similar 3 through its central hole 3a.

As may be observed with greater clarity in FIG. 2, cylindrical formation 2 consists of a central projection in the shape of long button 4 that is projected upwards so that it protrudes through the hole 3a of disk 3. The button 4 properly said is shaped as a continuous surface without cracks of a reduced diameter in comparison to the diameter of the central hole 3a of the disc and whose height is dimensioned so that its higher part is located above the vertical plane that contains the holding projections 5b of the disc, the lowest part in this button 4 being linked to a first L-shaped branch 5 directed (extending) upwards that is prolonged in a second L-shaped branch 5a bent downwards where said holding projections 5b are formed, the lowest part 5c of this second L-shaped branch 5a being linked to the inclined wings 6 and said lower part 5c being at a vertical distance regarding the bottom of the case 7 greater than the respective vertical distance of the lowest part of the button 4. In addition on the bottom of the case are provided additional fixed portions of a cylindrical wall 8 for guidance and support of the central hole 3a of the disc 3, whose portions 8 are shaped on the same circumference where the vertical tracts of the second L-shaped branch 5a lie.

As know from prior art, also and concentrically to the mentioned cylindrical formation 2 and at a distance corresponding to approximately the radius of disk 3, are molded on the wall of case 1, circular segments 9 with an area or support platform 9a on which lies supported the border or periphery of disk 3.

Because of the nature of the material that makes up case 1, as well as because of the configuration of the mentioned lateral branches 5 and oblique wings 6, these are flexible and can be deformed downwards when pressure is applied on button 4, according to what is represented schematically in FIG. 3, and is described in detail in the following.

With disc 3 engaged in its hole 3a in case 1, when the user presses, for example, with a finger button 4, the lateral branches 5 descend down pushing the oblique wings 6 that approach wall 7 of case 1, also, as well as these lateral branches 5 are connected on their lower end 5c with the oblique wings 6, when these descend, a flexion takes place inwards of the lateral branches 5, so that its projection 5b "moves back" and disk 3 is released from the withholding that these exercised. Also, as a disc 3 is engaged tautened by flexion by means of the engagement of its external border over the support platform or areas 9a of the circumference projections 9, when the mentioned central withholding is released, disc 3 is "pushed" upwards so that it disengages completely from its previous corresponding engagement.

As has already been mentioned the case is shaped in its remaining elements in likeness to a case for video tape cassettes and it presents like them, complementary closing elements provided in its covers 1a and 1b and for reasons of description economy are not detailed, since they are already known in this art.

As will be understood by the skilled persons in the art, a case according to the previously disclosed is of easy manufacturing in molding processes of plastic materials available in the market and it provides a secure engagement of the disk stored in it that remains in position until the user decides to use it.

As such object of the invention has been sufficiently described, only left is to indicate that the resulting embodiments of changes in shape, materials or similar, as well as those derived from an application of routine from the previously disclosed, must be considered included in its boundary so that the invention, will only be limited by the scope of the following claims.

What is claimed is:

1. Case for compact disks, digital video disks or similar, made from rigid plastic materials but substantially elastic with a portion (2) deformable by compression and generally cylindrical, molded in a central part of one of two covers or bindings (1b) of the case (1) on which the disk (3) engages tightly through a central hole (3a), and that has molded in one of said covers (1a) hooks or holding pincers (10) with elastic portions (10a) for the placement in a removable way of pamphlets or any type of printed material relating to the content of the disk (3); the elastic portion (2) being provided as a projection in a button-shape (4) with lateral branches (5) elastically deformable and formed as cylindrical wall segments, in whose upper extremity (5a) is formed a peripheral projection (5b) for the tight engagement of the central hole (3a) of the disk (3), and whose lateral branches (5) are connected on their lower ends (5c) with wings (6) tilted upwards and convergent towards the central part of the case that are formed by molding of the material of the wall of the corresponding binding or case cover (1b); the mentioned elastic wings (6) forming an angle in relation to the corresponding wall (7) of the case cover (1b); and in the wall (7) of the same case cover or binding (1b), being provided projections (9) in circular segment shape with an area or support platform (9a) for the external border of the disk (3), wherein the button (4) properly said is shaped as a continuous surface without cracks of a reduced diameter in comparison to the diameter of the central hole (3a) of the disc and whose height is dimensioned so that a higher part is located above the vertical plane that contains the holding projections (5b) of the disc, the lowest part in this button (4) being linked to first L-shaped branches (5) directed (extending) upwards that each is prolonged in a second L-shaped branch (5*a*) bent downwards where said holding projections (5*b*) are formed, a lowest part (5*c*) of this second L-shaped branch (5*a*) being linked to the inclined wings (6) and said lower part (5*c*) being at a vertical distance regarding the bottom of the case (7) greater than the respective vertical distance of the lowest part of the button, and wherein, on the bottom of the case are provided additional fixed portions of a cylindrical wall (8) for guidance and support of the central hole (3*a*) of the disc (3), whose portion (8) are shaped on the same circumference where the vertical tracts of the second L-shaped branch (5*a*) lie.

\* \* \* \* \*

UNITED STATES PATENT AND TRADEMARK OFFICE
CERTIFICATE OF CORRECTION

PATENT NO. : 6,206,186 B1
DATED : March 27, 2001
INVENTOR(S) : Cerda-Vilaplana et al.

It is certified that error appears in the above-identified patent and that said Letters Patent is hereby corrected as shown below:

<u>Title page,</u>
Item [54], please delete "DISKS" and insert -- DISCS --.
Item [22], please delete "Jan. 17, 1998" and insert -- Nov. 17, 1998 --.

<u>Column 1,</u>
Line 4, please delete "Nov. 11, 1997" and insert -- Nov. 20, 1997 --.

Signed and Sealed this

Thirtieth Day of April, 2002

*Attest:*

*Attesting Officer*

JAMES E. ROGAN
*Director of the United States Patent and Trademark Office*